(12) United States Patent
Duncan

(10) Patent No.: US 8,242,451 B2
(45) Date of Patent: Aug. 14, 2012

(54) APERTURE ARRANGEMENT

(75) Inventor: Stuart Duncan, Eidenburgh (GB)

(73) Assignee: Selex Galileo Ltd., Basildon, Essex (GB)

( * ) Notice: Subject to any disclaimer, the term of this patent is extended or adjusted under 35 U.S.C. 154(b) by 195 days.

(21) Appl. No.: 12/520,414

(22) PCT Filed: Dec. 19, 2007

(86) PCT No.: PCT/EP2007/064253
§ 371 (c)(1),
(2), (4) Date: Jun. 19, 2009

(87) PCT Pub. No.: WO2008/074842
PCT Pub. Date: Jun. 26, 2008

(65) Prior Publication Data
US 2011/0079721 A1    Apr. 7, 2011

(30) Foreign Application Priority Data

Dec. 20, 2006 (EP) .................................. 06270107
Dec. 20, 2006 (GB) .................................. 0625278.7

(51) Int. Cl.
*G01J 5/02*    (2006.01)
*G01J 5/00*    (2006.01)

(52) U.S. Cl. .................................. 250/352; 250/338.1

(58) Field of Classification Search .................. 250/332, 250/352, 353, 338.1; 359/356, 355, 357
See application file for complete search history.

(56) References Cited

U.S. PATENT DOCUMENTS 5,751,473 A * 5/1998 Runciman .................. 359/356
6,034,372 A    3/2000 LeVan
7,297,951 B2 * 11/2007 Chen et al. ............... 250/339.02

FOREIGN PATENT DOCUMENTS

GB    2 299 911 A    10/1996

OTHER PUBLICATIONS

Form PCT/ISA/210 (International Search Report) dated Apr. 7, 2008.

* cited by examiner

*Primary Examiner* — David Porta
*Assistant Examiner* — Faye Boosalis
(74) *Attorney, Agent, or Firm* — Buchanan Ingersoll & Rooney PC

(57) ABSTRACT

An aperture arrangement is disclosed, such as an aperture arrangement suitable for use with a dual wavelength infrared detector. A detector is disclosed which includes a casing; an aperture defined in one end of the casing; and a filter having an inner region and an outer region substantially (e.g., greater than 50%) covering the aperture; wherein the outer region of the filter transmits radiation within a first range of wavelengths and reflects radiation within a second range of wavelengths.

7 Claims, 4 Drawing Sheets

APERTURE ARRANGEMENT

The present invention relates to a cold stop aperture arrangement and specifically to a cold stop arrangement suitable for use with a dual waveband infrared detector and capable of operating at two different cold stop diameters dependent on the wavelength used by the detector.

A trend in the development of IR detectors is to provide detectors capable of switching between operating at two different wavelength ranges, for example a long wavelength band and a medium wavelength band, where two different functions can be provided at each wavelength range. This allows the advantage of both functions being provided with one device instead of two devices.

Adapting single-waveband IR detectors to become dual-waveband IR detectors brings about problems with the F-number. For each waveband mode of operation, different F-numbers may be required. The F-number is defined as the lens focal length described by the aperture diameter. This may be the result of different fields of view or different apertures being required for each waveband. As the F-number in a single-waveband IR detector is fixed, so by adapting the detector to become a dual-waveband detector, the F-number at the second wavelength may not be optimum. This creates a problem when using the one of the wavebands with a different entrance aperture diameter, as the surrounding material that defines the aperture creates noise as it is "visible" to the detector as a source of infrared radiation.

To reduce the noise emitted by the material surrounding the detector, the entire detector housing is cooled to 77° K. Typically, an aperture is fitted within the detector housing to minimise any noise originating from hot structure within the lens. This is known as the cold stop. The cold stop may be re-imaged by the lens at the entrance aperture to further minimise the noise.

One suggested solution is to allow the cold stop to increase and decrease in diameter through use of motors. The motors change the diameter of the stop as in a camera iris. This, however, means that the size of the housing needs to increase, to allow the motors to fit into the device. Thus a larger enclosure and extra components now need to be cooled, requiring increased cooling which in itself requires more space and power.

The present invention seeks to mitigate the problems associated with the known designs described above.

The present invention provides a detector comprising: a casing; an aperture defined in one end of the casing; and a filter having an inner region and an outer region substantially covering the aperture; wherein the outer region of the filter transmits radiation within a first range of wavelengths and reflects radiation within a second range of wavelengths.

The filter according to the invention comprises a dual zone filter which allows radiation of both wavelengths to transmit through the inner portion and only the longer wavelength radiation to transmit through the outer portion, reflecting the shorter wavelength radiation. Such an aperture arrangement is compact so can be fitted to smaller cooled enclosures and does not increase the cooling requirements significantly, if at all. Further, no control apparatus is required to change the aperture width when the infrared detector switches between wavelengths and there is no lag caused by having to wait for the aperture arrangement to switch between wavelengths.

Specific embodiments of the invention will now be described, by way of example only and with reference to the accompanying drawings that have like reference numerals, wherein:—

Figure 1:
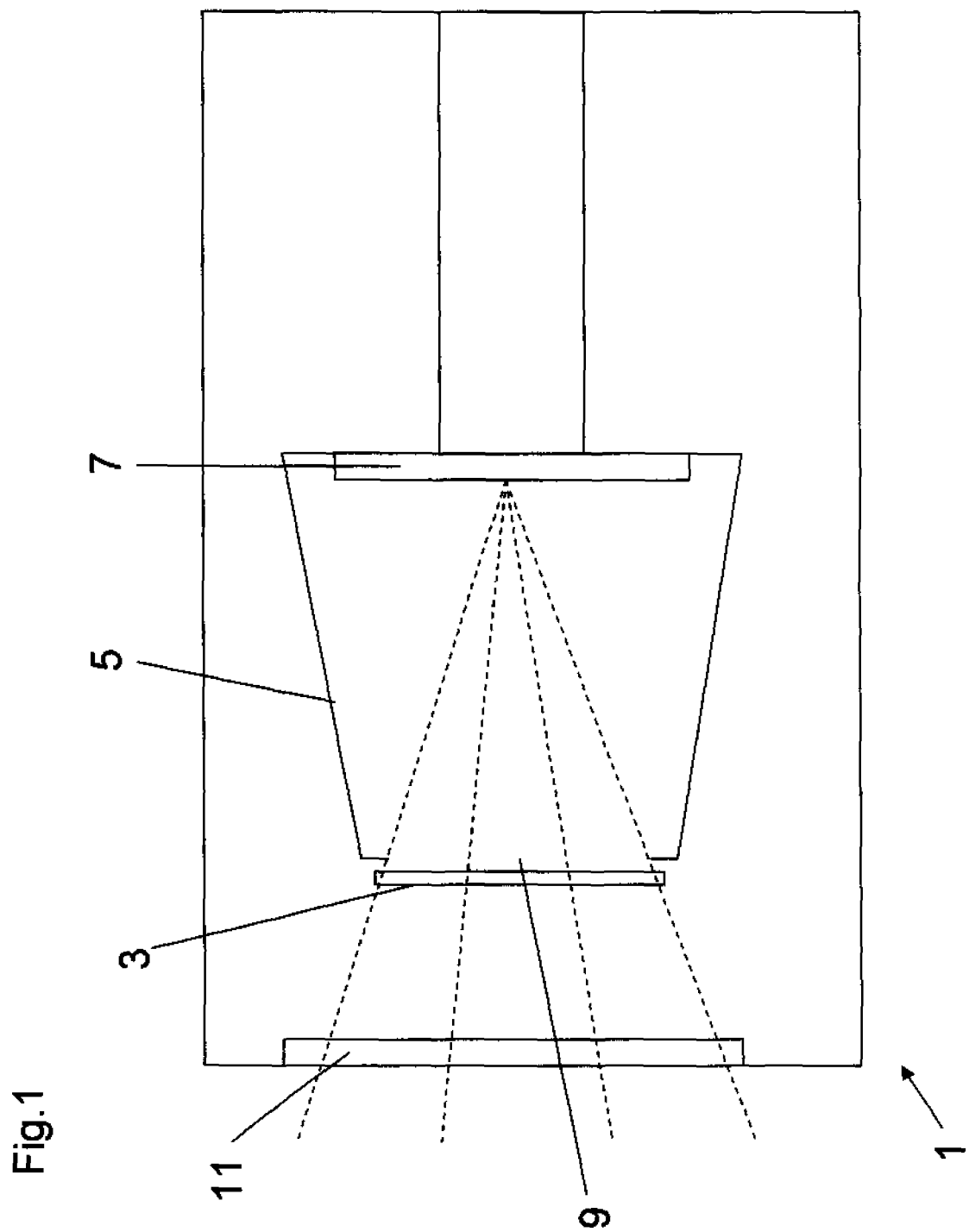
FIG. 1 is a diagram showing a cross section of a detector according to the present invention.
Figure 2:
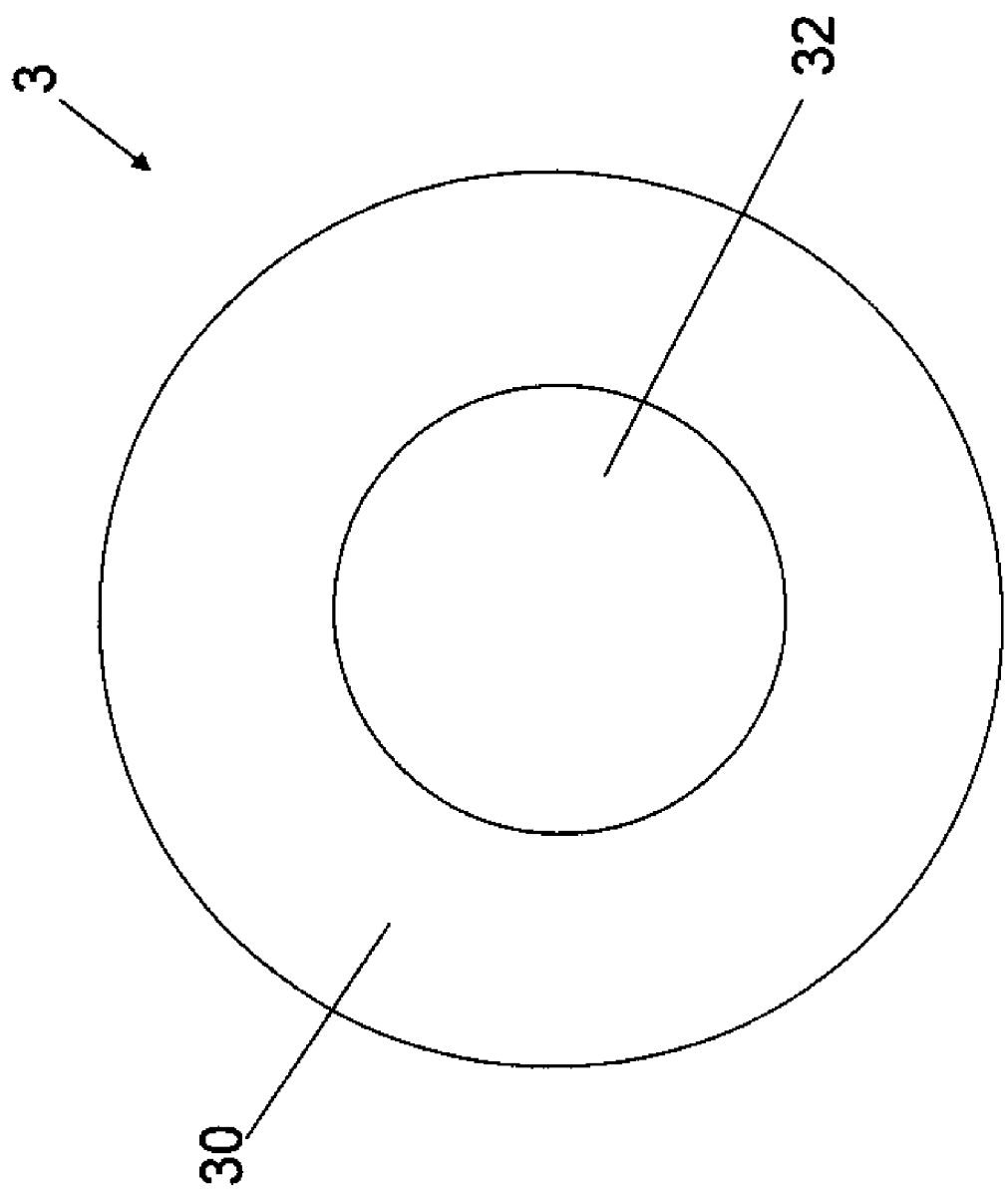
FIG. 2 is a diagram of the filter used in the detector shown in FIG. 1.
Figure 3:
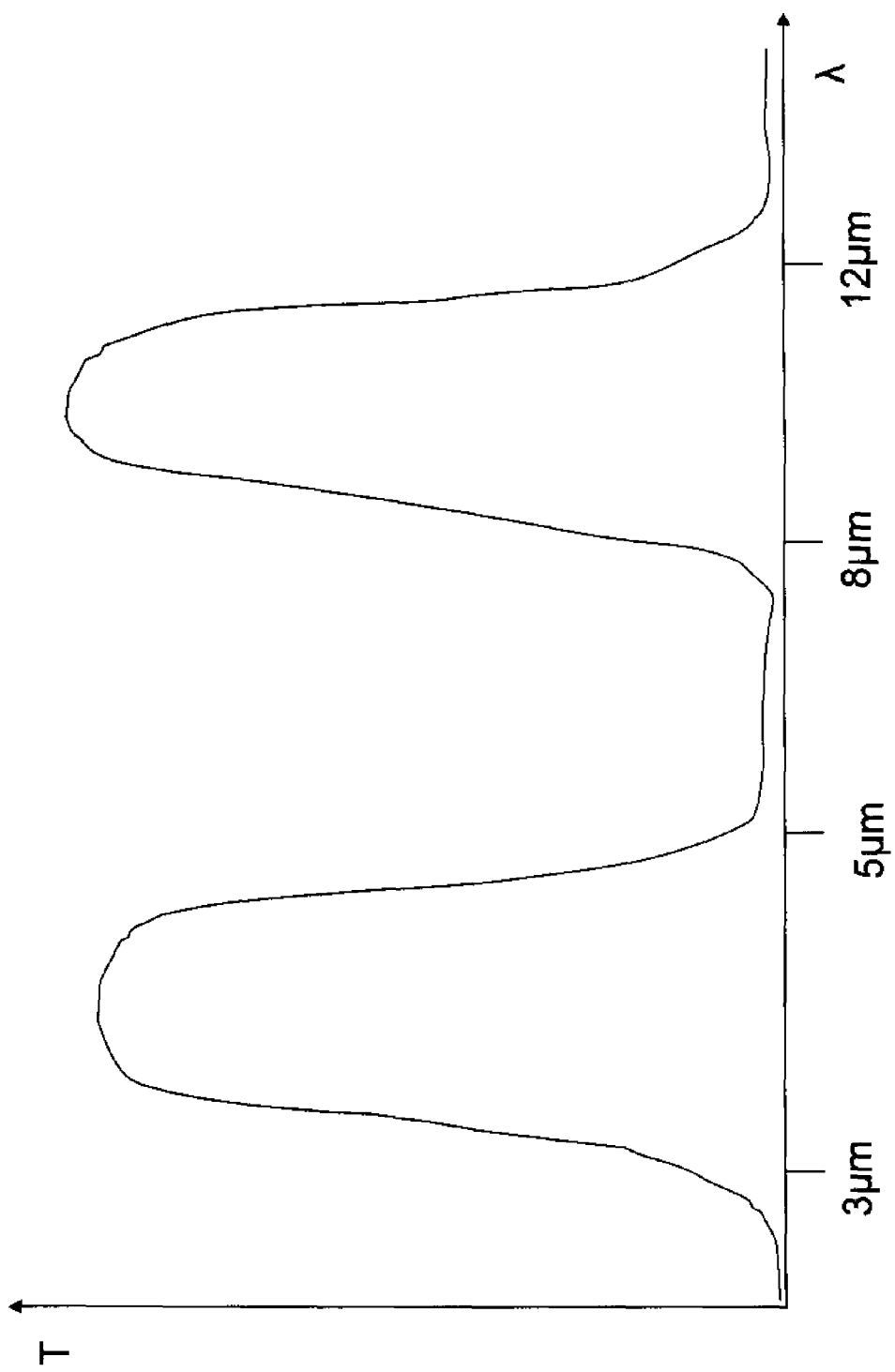
FIG. 3 is a graph of the characteristics of the inner zone of the filter of FIG. 2.
Figure 4:
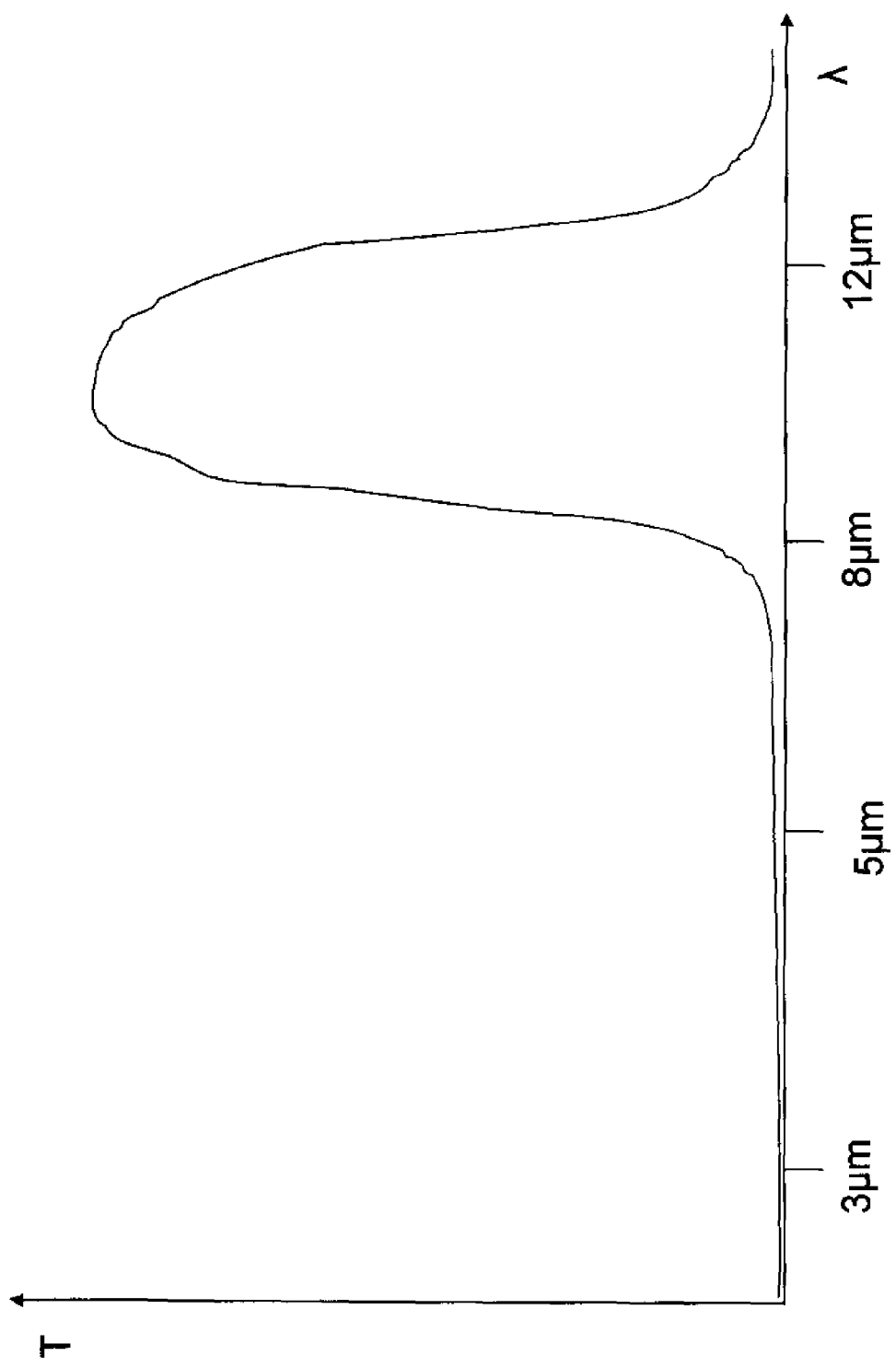
FIG. 4 is a graph of the characteristics of the outer zone of the filter of FIG. 2.

A specific embodiment of the present invention is shown in FIGS. 1 to 3 and the specific embodiment will now be described in relation to these figures.

Referring to FIG. 1, which illustrates an infrared detector device 1 according to the present invention, there is provided an infrared detector 7 inside a casing 5, the casing defining an aperture 9 through which radiation can pass. Between the aperture 9 and a window 11 in the device 1, there is provided a filter 3. In the present embodiment the two wavelength ranges are 3-5 μm and 8-12 μm.

Referring to FIG. 2, the filter 3 can be seen in more detail. The filter 3 comprises an inner section 32 and an outer section 30. The inner section 32 is configured to transmit at both wavelength ranges while the outer section 30 is configured to transmit the wavelength range 8-12 μm and reflect the wavelength range 3-5 μm. This can be achieved by first coating the central region of the filter with the dual band transmission properties then masking the filter and providing an additional 3-spur blocking filter coating to the outer zone.

FIG. 3 shows a graph of an exemplary transmission of radiation between the wavelengths range of 3-5 μm through a filter.

The above configuration allows a wide field of view at the longer wavelength band and a narrow field of view at the shorter wavelength band.

In an alternative embodiment, the filter can have an opening in the central zone of the filter thereby allowing all radiation to pass therethrough.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A detector device comprising:
   a casing;
   an aperture defined in one end of the casing;
   a filter having an inner region and an outer region substantially covering the aperture at the one end of the casing,
   a detector enclosed within the casing and disposed at an end of the casing opposite the aperture,
   wherein the inner region transmits radiation within a first range and a second range of wavelengths, and
   wherein the outer region of the filter transmits radiation within the first range of wavelengths and reflects radiation within the second range of wavelengths.

2. The detector according to claim 1, wherein the detector is an infrared detector.

3. The detector according to claim 2, wherein the first range of wavelengths is 8-12 μm and the second range of wavelengths is 3-5 μm.

4. The detector according to claim 2, wherein the detector is cooled through the casing.

5. The detector according to claim 1, wherein the first range of wavelengths is 8-12 µm and the second range of wavelengths is 3-5 µm.

6. The detector according to claim 5, wherein the detector is cooled through the casing.

7. The detector according to claim 1, wherein the detector is cooled through the casing.

* * * * *

UNITED STATES PATENT AND TRADEMARK OFFICE
CERTIFICATE OF CORRECTION

| | | Page 1 of 1 |
|---|---|---|
| PATENT NO. | : 8,242,451 B2 | |
| APPLICATION NO. | : 12/520414 | |
| DATED | : August 14, 2012 | |
| INVENTOR(S) | : Stuart Duncan | |

It is certified that error appears in the above-identified patent and that said Letters Patent is hereby corrected as shown below:

Title Page, Section (75) Inventor: change "Eidenburgh (GB)" to -- Edinburgh (GB) --.

Signed and Sealed this
Twentieth Day of November, 2012

David J. Kappos
*Director of the United States Patent and Trademark Office*